US010199918B2

(12) United States Patent
Podzemny et al.

(10) Patent No.: US 10,199,918 B2
(45) Date of Patent: Feb. 5, 2019

(54) METHOD OF FORMING A SEMICONDUCTOR DEVICE

(71) Applicant: SEMICONDUCTOR COMPONENTS INDUSTRIES, LLC, Phoenix, AZ (US)

(72) Inventors: Martin Podzemny, Valasske Mezirici (CZ); Vaclav Peroutka, Roznov Pod Radhostem (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/029,917

(22) Filed: Jul. 9, 2018

(65) Prior Publication Data

US 2019/0013726 A1   Jan. 10, 2019

Related U.S. Application Data

(60) Provisional application No. 62/530,432, filed on Jul. 10, 2017.

(51) Int. Cl.
| | |
|---|---|
| H02M 3/335 | (2006.01) |
| H02M 1/08 | (2006.01) |
| H02M 1/15 | (2006.01) |
| H02M 1/00 | (2006.01) |

(52) U.S. Cl.
CPC ............. H02M 1/083 (2013.01); H02M 1/15 (2013.01); H02M 3/33523 (2013.01); H02M 2001/0009 (2013.01); H02M 2001/0058 (2013.01)

(58) Field of Classification Search
CPC ............. H02M 3/335; H02M 3/33538; H02M 3/33523; H02M 3/33546; H02M 3/33515; H02M 3/33576; H02M 3/33592
USPC .................................. 363/16–21.18, 125–127
See application file for complete search history.

(56) References Cited

U.S. PATENT DOCUMENTS

| | | | | |
|---|---|---|---|---|
| 6,118,675 | A | * | 9/2000 | Lionetto ................. H02M 1/36 363/21.13 |
| 2005/0253636 | A1 | | 11/2005 | Yang et al. |
| 2006/0031689 | A1 | | 2/2006 | Yang et al. |
| 2009/0086513 | A1 | * | 4/2009 | Lombardo ........ H02M 3/33507 363/21.12 |

(Continued)

OTHER PUBLICATIONS

Disclosed Anonymously, "CCM/DCM Jitter Switching for Multimode Flyback Controllers," An IP.com Prior Art Database; Technical Disclosure, IP.com No. IPCOM000252328D, IP.com Electronic Publication Date: Jan. 4, 2018, 4 pages.

*Primary Examiner* — Adolf Berhane
*Assistant Examiner* — Nusrat Quddus
(74) *Attorney, Agent, or Firm* — Robert F. Hightower

(57) ABSTRACT

In one embodiment, a controller for a power supply may be configured to operate as a quasi-resonant controller while operating in a discontinuous current mode and to operate as one of a pulse width or pulse frequency modulation controller while operating in a continuous current mode. The controller may have an embodiment that varies a frequency of the switching drive signal around a center frequency while operating in the continuous current mode, and varies a value of a current sense signal but not vary the frequency of the switching drive signal around a center frequency while operating in the discontinuous current mode.

20 Claims, 4 Drawing Sheets

(56) References Cited

U.S. PATENT DOCUMENTS

| | | | |
|---|---|---|---|
| 2010/0045377 A1* | 2/2010 | Witchard | G04F 1/005 |
| | | | 330/251 |
| 2010/0302816 A1* | 12/2010 | Hu | H02M 3/33507 |
| | | | 363/21.12 |
| 2010/0321963 A1* | 12/2010 | Yamashita | H02M 3/33507 |
| | | | 363/21.17 |
| 2012/0320632 A1* | 12/2012 | Kalodka | H02M 3/33507 |
| | | | 363/16 |
| 2013/0106379 A1 | 5/2013 | Morrish | |
| 2013/0169370 A1 | 7/2013 | Tang et al. | |
| 2013/0294118 A1* | 11/2013 | So | H02M 3/33507 |
| | | | 363/21.16 |
| 2014/0036552 A1* | 2/2014 | Saji | H02M 1/44 |
| | | | 363/21.17 |
| 2014/0049301 A1 | 2/2014 | Blanken et al. | |
| 2014/0085936 A1* | 3/2014 | Jin | H02M 1/44 |
| | | | 363/16 |
| 2014/0265908 A1* | 9/2014 | Su | H05B 33/0815 |
| | | | 315/224 |
| 2014/0328090 A1* | 11/2014 | Takahashi | H02M 3/33507 |
| | | | 363/21.17 |
| 2017/0054374 A1* | 2/2017 | Fang | H02M 3/33523 |
| 2017/0207778 A1* | 7/2017 | Podzemny | H03K 5/135 |

\* cited by examiner

METHOD OF FORMING A SEMICONDUCTOR DEVICE

PRIORITY CLAIM TO PRIOR PROVISIONAL FILING

This application claims priority to prior filed Provisional Application No. 62/530,432 entitled "POWER SUPPLY CONTROLLER AND METHOD THEREFOR" filed on Jul. 10, 2017, and having common inventors Martin Podzemny et al. which is hereby incorporated herein by reference

BACKGROUND OF THE INVENTION

The present invention relates, in general, to electronics, and more particularly, to semiconductors, structures thereof, and methods of forming semiconductor devices.

In the past, the electronics industry utilized various methods and circuits to form power supply controllers that used frequency jittering to reduce electromagnetic interference (EMI). The frequency jittering typically involved varying the operating frequency of the switching signal slightly around a nominal switching frequency or center frequency. In some operating modes the power supply controller may switch between operating in a continuous current mode (CCM) and a discontinuous current mode (DCM). Those skilled in the art will appreciate that the continuous current mode (CCM) may also be referred to as a continuous conduction mode (CCM) and that the discontinuous current mode (DCM) may also be referred to as the discontinuous conduction mode (DCM). The transitions between the CCM and DCM modes, and vice versa, could cause discontinuities that resulted in improper regulation of the output voltage.

Accordingly, it is desirable to have a controller that can switch between CCM and DCM modes and provide better control of the output voltage.

Figure 1:
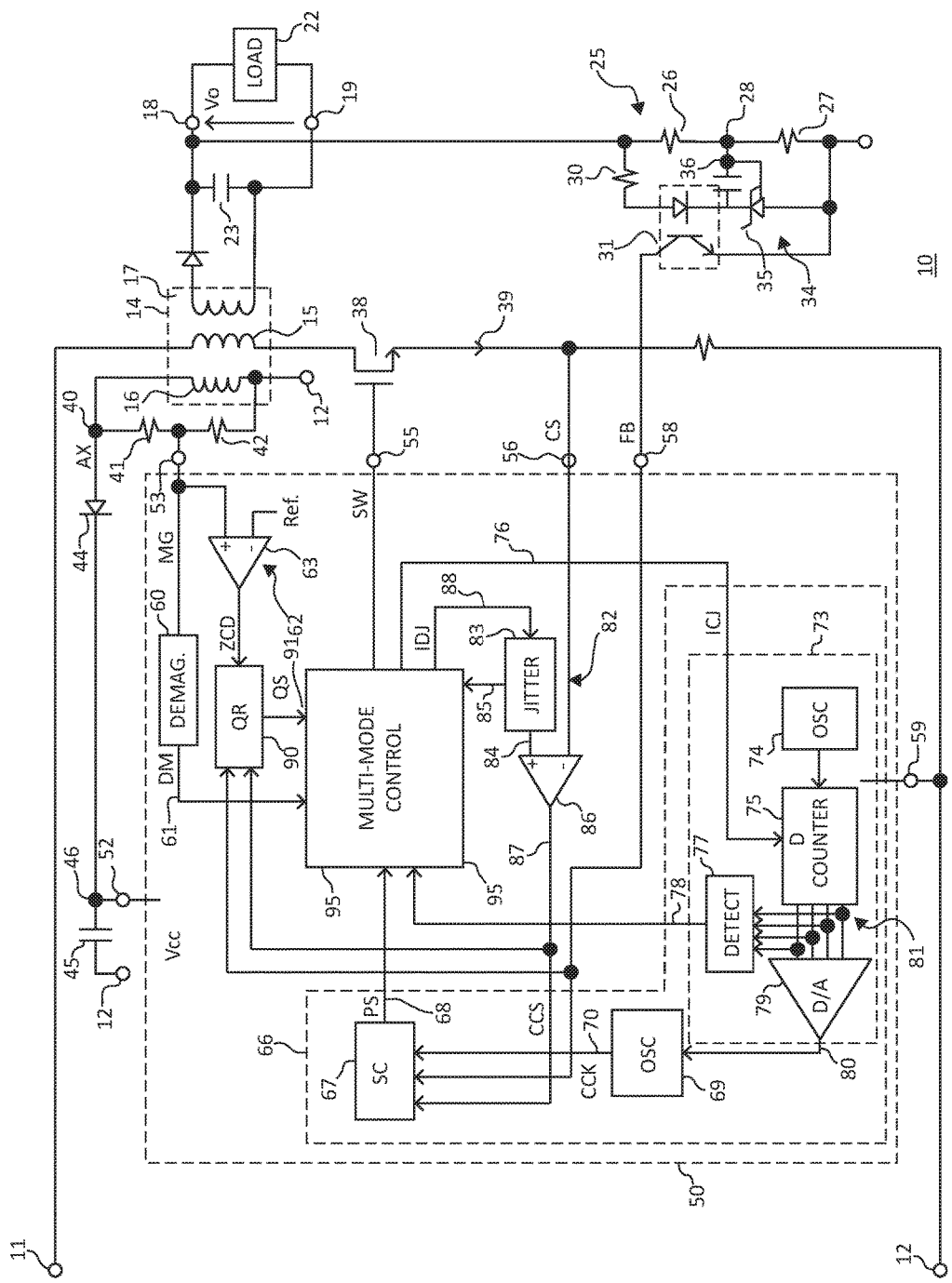
FIG. 1 schematically illustrates an example of an embodiment of a power supply system that includes a power supply control circuit in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for some elements including semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures, or characteristics may be combined in any suitable manner, as would be apparent to one of ordinary skill in the art, in one or more embodiments.

The embodiments illustrated and described hereinafter suitably may have embodiments and/or may be practiced in the absence of any element which is not specifically disclosed herein.

DETAILED DESCRIPTION OF THE DRAWINGS

FIG. 1 schematically illustrates an example of an embodiment of a power supply system 10 that is configured to receive input power between an input terminal 11 and a common return terminal 12, and form a regulated output voltage Vo between an output terminal 18 and output return terminal 19. The received input power may include an input voltage that is received between terminals 11 and 12. The input voltage may be an unregulated voltage such as for example a DC voltage in the form of a rectified AC voltage, or other type of voltage. System 10 may be configured to supply power, including the output voltage Vo, to a load 22. A power switch, such as a transistor 38 for example, may be configured to switch a primary winding 15 of a transformer 14 in order to form Vo from a secondary winding 17. Transformer 14 may also include an auxiliary winding 16. A power supply control circuit or controller 50 may assist in forming voltage Vo. In some embodiments, transistor 38 may be a portion of circuit 50.

A feedback circuit 25 may be configured to receive output voltage Vo and form a feedback (FB) signal that is representative of the value of the output voltage Vo. Those skilled in the art will appreciate that feedback circuit 25 may have various embodiments that are well known to those skilled in the art, as long as the circuit forms the FB signal that is representative of voltage Vo. One example embodiment of circuit 25 is illustrated in FIG. 1 and includes a resistor divider formed by resistors 26 and 27 that receives voltage Vo and forms a signal at a node 28 that is a fraction of the value of voltage Vo. Circuit 25 may also include an error amplifier 34 that receives the signal from node 28 and forms an error signal that is representative of a difference between voltage Vo and a desired value of voltage Vo. The desired value may include a target value and a range of values around the target value. For example, the target value may be three volts (3v) and the range of values may be plus or minus five percent (5%) around the three volts. In an embodiment, error amplifier 34 may include a shunt regulator 35 and a compensation capacitor 36. Shunt regulator 35 may be a TL437 that is well known to those skilled in the art. Circuit 25 may also include an optical coupler 31 that has a photo emitter coupled to amplifier 34 and a photo detector, such as for example a photo transistor, that receives light emitted by the photo emitter. Such a circuit is well known to those skilled in the art. In other embodiments, error amplifier 34 may a part of circuit 50.

Auxiliary winding 16 may form an auxiliary signal AX, at an output 40 of winding 16, that is representative of the signal formed by secondary winding 17. Signal AX may also be representative of a magnetization condition of transformer 14. A diode 44 and a capacitor 45 may be configured to form a power supply voltage Vcc at a power supply node 46 for providing operating power for circuit 50.

Controller 50 may have an embodiment that may be configured to form a switching drive (SW) signal to control transistor 38. Controller 50 may be configured to receive input power, such as for example voltage Vcc, between a voltage input 52 and a voltage return 59. In an embodiment, input 52 may be connected to node 46 and return 59 may be connected to terminal 12. Circuit 50 may also include an auxiliary input 53 that is configured to receive a magnetization signal (MG) that is representative of the AX signal from AX winding 16. An embodiment of the MG signal is representative of a magnetization condition or alternately a magnetization state of transformer 14. The MG signal may also be used to detect demagnetization of transformer 14 and/or ringing of transformer 14 after the demagnetization. Controller 50 may also include an output 55 that may be configured to provide the switching drive (SW) signal to control transistor 38 and a current 39 that flows through transistor 38. A current sense input 56 of controller 50 may be configured to receive a current sense (CS) signal that is representative of current 39, and a feedback input 58 may be configured to receive the FB signal. An embodiment of controller 50 may be configured to operate as a switching control circuit under the conditions requiring operating in a continuous conduction (CCM) mode and may also be configured to operate as a quasi-resonant control (QR) circuit under the conditions of working in a discontinuous conduction (DCM) mode.

Controller 50 may include a switching control circuit 66, a demagnetization detection circuit 60, a zero crossing detection circuit 62, a quasi-resonant (QR) control circuit 90, a current sense circuit 82, and a multi-mode control circuit 95. Controller 50 may be configured to operate as the switching control circuit including operation in the CCM mode as a leading-edge PWM circuit, or a trailing edge PWM circuit, or a leading-trailing edge PWM circuit, or a pulse frequency control circuit that varies the center frequency in response to the FB signal or the CS signal or both. Controller 50 may be configured to operate circuit 66 as the switching control circuit including operation as a leading-edge PWM circuit that asserts a pulse signal (PS) signal 68 in response to an edge of a clock (CCK) signal 70, and negates PS signal 68 in response to the value of the FB signal, or a value of the CS signal, or a value of the FB signal relative to a value of the CS signal or vice versa, or a combination thereof. Those skilled in the art will appreciate that circuit 66 may have other embodiments such as a trailing edge PWM circuit or a leading-trailing edge PWM circuit, or a pulse frequency control circuit that varies the center frequency in response to the FB signal or the CS signal or both.

An embodiment of QR circuit 90 may be configured control the switching drive (SW) signal to operate as a quasi-resonant signal. For example, circuit 90 may be configured to assert a QR switching (QS) signal 91 in response to an asserted value of the ZCD signal from circuit 62. Circuit 62 may be configured to detect a zero crossing of the MG signal responsively assert the ZCD signal. Circuit 90 may be configured to negate QS signal 91 in response to the value of the FB signal, or a value of the CS signal, or a value of the FB signal relative to a value of the CS signal or vice versa, or a combination thereof. Circuit 95 may be configured to select PS signal 68 as the SW signal on output 55 in response to operating in the CCM mode and may be configured to select QS signal 91 as the SW signal on output 55 in response to operating in the DCM mode.

Circuit 66 may have an embodiment that may include a switching control (SC) circuit 67, an oscillator 69, and a CCM frequency jitter circuit or jitter circuit 73. Oscillator 69 is configured to form a CCM clock (CCK) signal 70 that controls the switching frequency of PS signal 68. In an embodiment, circuit 73 is configured to form a jitter signal 80 that is used to slowly vary the operating frequency of oscillator 69 around a center frequency of oscillator 69. Signal 80 generally is an analog signal that slowly increases and decreases around a center value such that the changes in the value of signal 80 vary the operating frequency of signal 70 around the center frequency of oscillator 69. The frequency at which signal 80 varies is usually at least one or two orders of magnitude slower than the center frequency of signal 70. In some embodiments, the frequency of signal 80 may be more or less than two orders of magnitude slower than the center frequency of oscillator 69. For those embodiments where circuit 66 may include a PFM control circuit, the center frequency may be set or varied by the FB or other signal, however, signal 80 still varies the operating frequency around that center frequency.

Those skilled in the art will also appreciate that there are various embodiments for circuit 73. One example embodiment illustrated in FIG. 1 includes an oscillator 74, a counter 75, a detect circuit 77, and a digital to analog converter circuit or D/A 79. Counter 75 counts the transitions of oscillator 74 and provides a digital output 81 that represents the current count of counter 75. In an embodiment, counter 75 may be a 4-bit counter that repeatedly counts from 0 to 15 in response to the clock signal provided by oscillator 74. Counter 75 may also include a disable input that will prevent counter 75 from incrementing in response to an asserted state of a disable (D) input. For such an example embodiment, the value of the digital word in counter 75 may represented as a hexa-decimal number and in one embodiment may have a median or midpoint value of the number 7. D/A 79 receives the digital signal from counter 75 and converts the digital signal to analog signal 80. Those skilled in the art will also appreciate that circuit 73 may have embodiments in which counter 75 has fewer or greater number of bits and where the midpoint value may be different from seven (7). Additionally, those skilled in the art will appreciate that circuit 73 and signal 80 may have various other embodiments, such as for example the alternate embodiment described in the description of FIG. 5.

An embodiment of circuit 82 may include a DCM jitter circuit 83 that forms a DCM jitter signal 84, and an amplifier 86. Circuit 83 may have an embodiment that includes a counter, a detect circuit, and a D/A circuit similar to counter 75 and circuits 77 and 79, respectively. One example embodiment of circuit 83 is explained in the description of FIG. 2. Circuit 82 may be configured to form a composite current sense (CCS) signal 87, such as for example on the output of amplifier 86, that is representative of the CS signal.

Circuit 83 may have an embodiment that may be configured to form signal 84 as an analog signal that slowly varies around a center value as circuit 50 operates in the DCM mode. Consequently, while operating in the DCM mode, circuit 82 may form compensated current source (CCS) signal 87 to have a value that is representative of the value of the current sense (CS) signal received on input 56 but varied by the value of DCM jitter signal 84. An embodiment of circuit 82 may be configured to form CCS signal 87 as a substantially the CS signal in response to circuit 50 operating in the CCM mode. Circuit 83 may have a variety of embodiments including the example embodiment described in the description of either of FIG. 2 or 5.

Figure 2:
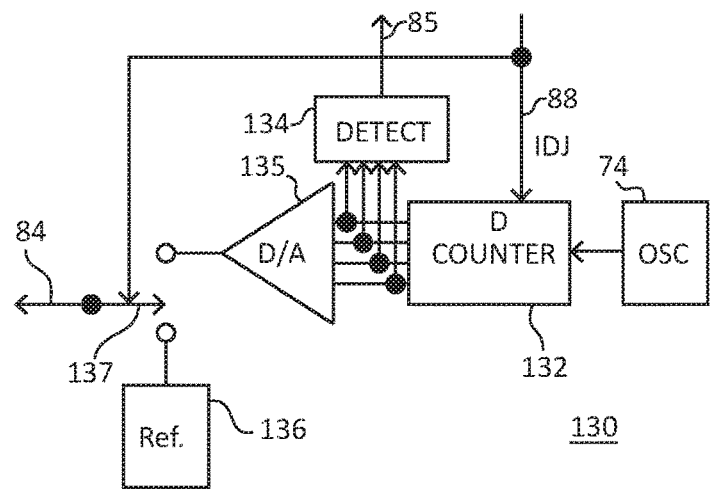
FIG. 2 schematically illustrates an example of an embodiment of a jitter circuit that may be a portion of an embodiment of the power supply control circuit of FIG. 1 in accordance with the present invention.

FIG. 2 schematically illustrates an example of an embodiment of a jitter circuit 130 that may have an embodiment that could be an alternate embodiment of circuit 83 of FIG. 1. Circuit 130 includes a counter 132, a detect circuit 134, a digital-to-analog converter (D/A) circuit 135, an optional reference circuit 136, and an optional switch 137. Circuit 130 may use the same oscillator 74 used by circuit 73 or may have a separate oscillator. Counter 132 is configured to count in response to receiving clock signals from oscillator 74. Detect circuit 134 receives the outputs of counter 132 and asserts signal 85 in response to detecting the midpoint or middle value of counter 132. Circuit 95 (FIG. 1) receives the asserted state of signal 85 and responsively asserts IDJ signal 88. Counter 132 receives IDJ signal 88 and inhibits counting in response to the asserted state of signal 88, and maintains the average value number. D/A 135 also receives the outputs of counter 132 and forms an analog signal that has a value that is representative of the digital value of counter 132. To facilitate circuit 50 operating in the CCM mode, circuit 130 may have optional reference circuit 136 that may be utilized to form a fixed value reference circuit for amplifier 86 (FIG. 1). Optional switch 137 may be configured to select either the analog output of D/A 135 in response to the negated state of signal 88 or the output of reference 136 in response to the asserted state of signal 88.

Those skilled in the art will appreciate that circuit 50 may use other circuits to form the CS signal for 67 during operation in the CCM mode. For example, circuit 50 could include another amplifier or buffer to send the CS signal to circuit 67 instead of using signal 87.

Figure 3:
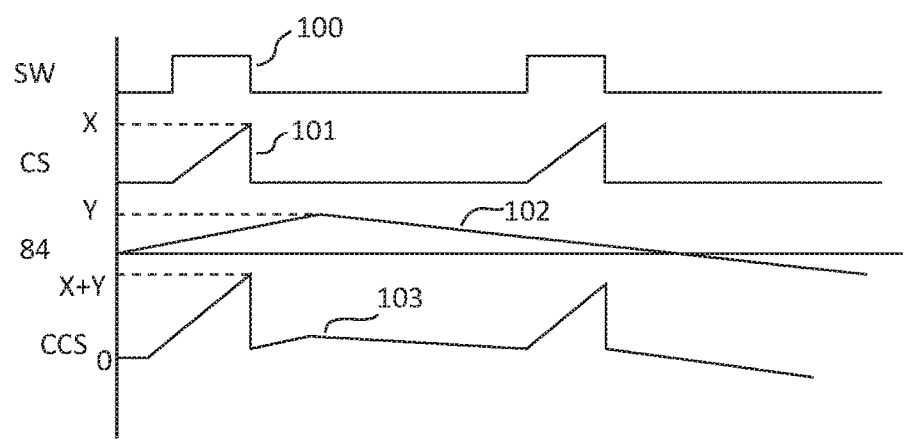
FIG. 3 is a graph having plots that illustrate an example of an embodiment of some signals that may be formed during the operation of an embodiment of the circuit of FIG. 2 in accordance with the present invention.

FIG. 3 is a graph having plots that illustrate an example of an embodiment of some signals that may be formed during the operation of an embodiment of circuit 82. The abscissa indicates time and the ordinate indicates increasing value of the illustrated signal(s). A plot 100 illustrates an example of the SW signal on output 55, a plot 101 illustrates an example of the CS signal received on input 56, a plot 102 illustrates an example of an embodiment of DCM jitter signal 84, and a plot 103 illustrates an example of CCS signal 87. As illustrated by FIG. 2, DCM jitter signal 84 modulates or varies the CS signal to form the compensated current sense (CCS) signal 87 while controller 50 is operating in the DCM mode.

An embodiment of circuit 50 is configured to control jitter circuits 73 and 83 during transitions between CCM-to-DCM modes and between DCM-to-CCM modes in order to minimize discontinuities in the value of the output voltage Vo or to minimize ripple on the output voltage or unintentional changes to the switching frequency An embodiment of circuit 50 is configured to allow a transition from CCM mode to DCM mode only after detecting the demagnetization of transformer 14 and detecting that signal 80 is at substantially a midpoint or average value of signal 80. Allowing a transition from CCM to DCM only when the CCM jitter is at the substantially midpoint allows the transition to occur when oscillator 69 is at substantially the center operating frequency of oscillator 69. This assists in keeping the center frequency substantially constant and minimizing unintentional changes in the center frequency. Similarly, an embodiment of circuit 50 is configured to control circuits 73 and 83 during transitions between DCM-to-CCM only when the demagnetization is not detected and DCM jitter is at substantially a midpoint or average value of signal 84. Allowing transitions from DCM to CCM only when the DCM jitter as at substantially the midpoint allows the transition to occur when compensated current sense signal 87 is substantially equal to the CS signal received on input 56. This assists in minimizing ripple on the output voltage. An embodiment of circuit 50 is configured to control circuits 73 and 83 such that the transition from DCM-to-CCM or CCM-to-DCM causes the corresponding one of signals 80 or 84 to vary in value oppositely to the variation of the other signal. Additionally, an embodiment of circuit 50 is configured to control the transition from CCM mode to DCM mode to include counting the number of valleys of the AX signal that occur for each CCM switching cycle prior to beginning operation in the DCM mode. For example, after detecting the demagnetization of transformer 14 there may be one or more switching cycles that occur in the CCM mode prior to signal 80 reaching the substantially average value. For each of these CCM cycles, circuit 50 counts the number of valleys that occur. This is referred to as a valley count operation and the number of valleys is referred to as the valley count. Upon operation in the DCM mode, for each DCM cycle circuit 50 counts this number of valleys (valley count number) before asserting the SW signal to enable transistor 38.

Figure 4:
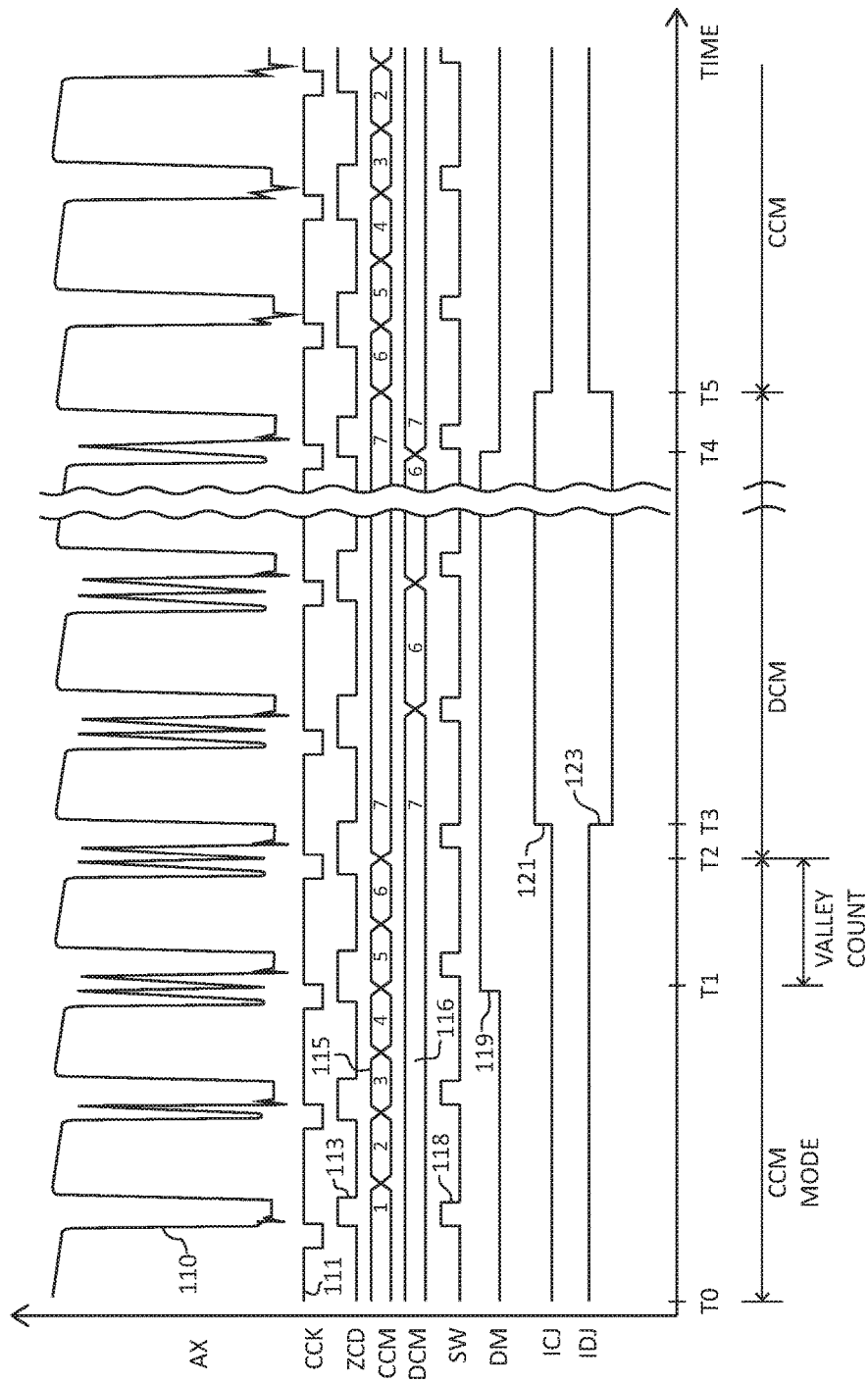
FIG. 4 is a graph having plots that illustrate an example of an embodiment of some signals that may be formed during the operation of an embodiment of the circuit of FIG. 1 in accordance with the present invention.

FIG. 4 is a graph having plots that illustrate an example of an embodiment of some of the signals that may be formed during the operation of an example of an embodiment of controller 50. The abscissa indicates time and the ordinate indicates increasing value of the illustrated signal(s). A plot 110 illustrates an example of the AX signal from output 40, a plot 111 illustrates CCK signal 70, a plot 113 illustrates the ZCD signal, a plot 115 illustrates the values of CCM counter 75, a plot 116 illustrates the values of DCM counter 132, a plot 118 illustrates the SW signal on output 55, a plot 119 illustrates demagnetization detection (DM) signal 61, a plot 121 illustrates an inhibit CCM jitter (ICJ) signal 76, and a plot 123 illustrates inhibit DCM jitter (IDJ) signal 88. This description has references to at least FIGS. 1-2 and 4. It should be noted that there is a discontinuity in the graph of FIG. 4, the discontinuity represent a break in time where operating modes have not changed during the discontinuity. The discontinuity is just prior to a time t4 while operating in the DCM mode. The discontinuity is for clarity of the graph. Additionally, for the following description assume that the midpoint or average value of counters 75 and 132 is a value of seven (7).

Assume that at a time to, circuit 50 and system 10 are operating in the CCM operating mode. Thus, ICJ signal 76 is negated so that signal 80 is varying to vary the operating frequency of oscillator 69, and IDJ signal 88 is asserted to prevent circuit 82 from affecting the CS signal. Thus, CCS signal 87 is substantially equal to the CS signal. Additionally, circuit 95 selects PS signal 68 as the SW signal on output 55. In an embodiment, circuit 50 may be operating as a PWM controller in the CCM mode. Counter 75 is counting as illustrated by plot 115 and the values 0, 1, 2, 3, etc. The asserted value of IDG signal 88 inhibits circuit 83 from counting as illustrated by plot 116.

Assume that at a time t1 changes occur, such as for example a change in load 22, and circuit 50 detects the demagnetization of transformer 14 as illustrated by the asserted value of (DM) signal 61 illustrated by plot 119. Although demagnetization is detected, the value of CCM jitter signal 80 is not at the midpoint value, thus, circuit 50 continues operating in the CCM mode during the valley count interval until counter 75 reaches the midpoint value illustrated by the number 7 (seven) in plot 115. Alternately, controller 50 may be configured to detect a combination of substantially demagnetization of the transformer and the pulse signal having substantially the center frequency. For each CCM cycle after detecting the demagnetization of transformer 14, circuit 50 counts the number of valleys that occur after each negation of the SW signal and saves that value as the valley count (VC) value. For example, circuit 50, or alternately circuit 95, may account the valleys of the AX signal for each CCM switching cycle after signal 61 is asserted. At a time t2 circuit 73 forms signal 80 to have the midpoint or average value, as illustrated by plot 115, and at a time t3 circuit 50 (or alternately circuit 95) asserts ICJ signal 76 to inhibit varying the value of 80 and inhibit operating in the CCM mode. Circuit 73 is configured to maintain the average value or midpoint count after ICJ is asserted as illustrates by plot 115. Circuit 50 also negates IDJ signal 88 to facilitate varying the value of signal 87 and enable operating in the DCM mode. Consequently, circuit 95 selects QS signal 91 as the SW signal on output 55. During DCM operation, circuit 90, or circuit 50, uses the VC value to determine the time to enable the SW signal for each cycle of the SW signal.

Negating IDJ signal 88 allows circuit 83 to begin varying signal 84 and to vary the value of CCS signal 87 around the value of the CS signal received on input 56. In an embodiment, circuit 82 is configured to vary the value of signal 84 opposite to the direction that signal 80 was varying. For example, if signal 80 was increasing (or alternately decreasing), circuit 82 forms signal 84 to begin decreasing (or alternately increasing). Forming circuit 82 (or alternately circuit 73) to vary signal 84 (alternately signal 80) opposite to the variation of signal 80 assists in keeping the center frequency from changing as a result of the transition. After negating the SW signal and prior to initiating a subsequent switching cycle, circuit 50 is configured to count the valley count (VC) number of valleys of the AX signal prior to re-asserting the SW signal to enable transistor 38. Circuit 50 continues operating in the DCM mode as long as DM signal 61 is asserted as illustrated between times t3 and t4. One skilled in the art will appreciate that an embodiment of circuit 50 is configured to jitter the value of the CS signal and not jitter the center value of the operating frequency of circuit 50 during operation in the DCM mode, although the center frequency may vary due to the normal QR operation.

Assume that just prior to a time t4, circuit 50 is operating in the DCM mode and that counter 132 (FIG. 4) is counting up as is illustrated by the value 6 (six) in plot 116 after the discontinuity. At time t4 circuit 50 detects that the demagnetization has not occurred and negates signal 61. Circuit 50 continues operating in the DCM mode until the value of signal 87 has reached its midpoint or average value as illustrated by the number 7 (seven) in plot 116. At time t5, signal 84 reaches the midpoint or average value and circuit 83 asserts signal 85 indicating that signal 84 has reached the midpoint or average value, for example counter 132 has reached the number 7. Consequently, circuit 50 asserts IDJ signal 88 to inhibit jitter circuit 82 from affecting the value of the CS signal, and negates the ICJ signal 76 to allow circuit 73 to begin varying the frequency of oscillator 70. Alternately, controller 50 may be configured to detect substantially no demagnetization of the transformer and the compensated current signal having the value of the current sense signal.

Jittering the CS signal and not jittering the operating frequency during DCM operation assists in having the jitter signal at substantially the midpoint or middle value before making a CCM-to-DCM or DCM-to-CCM transition which assists in reducing fluctuations in the value of the output voltage and provides better regulation of the output voltage. During the transitions, controlling the jitter signal to vary oppositely to the previously varying or active jitter signal also assists in improving the output voltage regulation.

Figure 5:
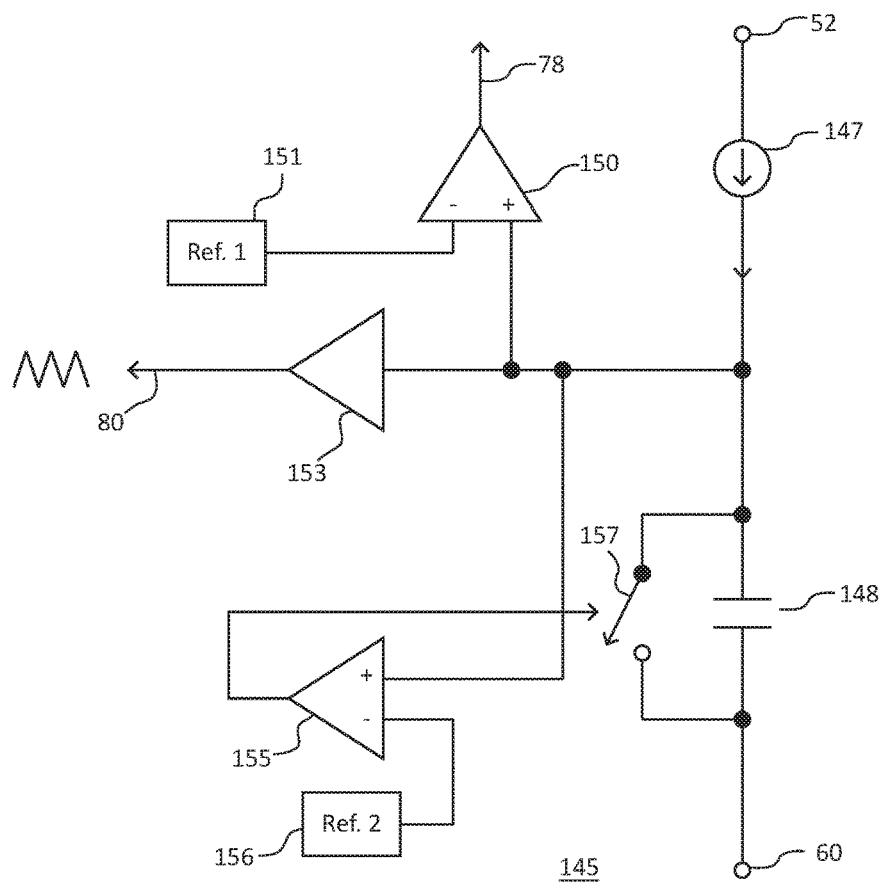
FIG. 5 schematically illustrates an example of an embodiment of a jitter circuit that may be an alternate embodiment of some of the circuits of FIG. 1 in accordance with the present invention.

FIG. 5 schematically illustrates an example of an embodiment of a jitter circuit 145 that may have an embodiment that could be an alternate embodiment of either of circuit 83 or circuit 73. Circuit 145 includes a capacitor 148 coupled to be charge by a current source 147. A comparator 155 compares the value of capacitor 148 to a value from a reference circuit or Ref. 2 to form the operating frequency of circuit 145. Comparator 155 periodically closes switch 157 to form signal 80 as a ramp signal. A comparator 150 may receive the signal from capacitor 48 and form signal 78 or alternately signal 85 in response to detecting a middle or midpoint of the value to which capacitor 148 may be charged. A reference circuit illustrated as a Ref. 1 may assist in forming signal 78. An amplifier 153 receives the value from capacitor 148 and forms signal 80 or alternately signal 84. An embodiment of circuit 145 may also include circuit 136 and switch 137 from FIG. 2.

Figure 6:
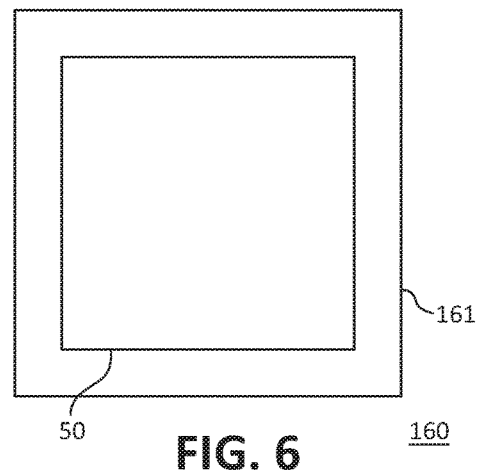
FIG. 6 illustrates an enlarged plan view of a semiconductor device that includes the power supply control circuit of FIG. 1 in accordance with the present invention.

FIG. 6 illustrates an enlarged plan view of a portion of an embodiment of a semiconductor device or integrated circuit 160 that is formed on a semiconductor die 161. In an embodiment, circuit 50 may be formed on die 161. Die 161 may also include other circuits that are not shown in FIG. 6 for simplicity of the drawing. Device or integrated circuit 160 may be formed on die 161 by semiconductor manufacturing techniques that are well known to those skilled in the art.

In order to assist in providing the operation and functionality as described hereinbefore input 53 is configured to receive a signal representative of the AX signal and maybe connected to a non-inverting input of comparator 63 and to an input of circuit 60. An output of circuit 60 may be connected to an input of circuit 95. An inverting input of comparator 63 may be connected to receive a reference signal (Ref.), and an output of comparator 63 may be connected to an input of circuit 90. Circuit 90 may have an output connected to another input of circuit 95. Input 58 of circuit 50 may be configured to receive the FB signal and maybe connected to an input of circuit 90 and to an input of circuit 66 or circuit 67. Input 56 may be configured to receive the CS signal and to be connected to a non-inverting input of amplifier 86. An inverting input of amplifier 86 may be connected to an output of circuit 83, and the output of amplifier 86 may be connected to another input of circuit 90 and to another input of circuit 66 or alternately circuit 67. Circuit 95 may have an output configured to form the SW signal and provide the signal to output 55. An output of circuit 95 may be configured to form the IDJ signal and connected to an input of circuit 83. Circuit 83 may have an output connected to an input of circuit 95. Another output of circuit 95 may be configured to form the ICJ signal 76 on an output and connect that output to an ICJ input of circuit 66 or alternately circuit 73, or alternately counter 75. Counter 75 may have another input connected to receive the signal from oscillator 74. Counter 75 may have outputs 81 connected to inputs of detect circuit 77 and to inputs of D/A circuit 79. Circuit 77 may have an output configured to form signal 78 which may be connected to an input of circuit 95. D/A circuit 79 may have an output connected to an input of oscillator 69. An output of oscillator 69 may be connected to an input of circuit 67.

Referring to FIG. 2, counter 132 may have an input connected to an output of oscillator 74 or to an output of the different oscillator. Counter 132 may have an input connected to the IDJ output of circuit 95. Outputs of counter 92 may be connected to inputs of circuit 134 and inputs of D/A circuit 135. An output of circuit 134 may be connected to an input of circuit 95. An output of D/A circuit 135 may optionally be connected to a first terminal of switch 137 which has a second terminal connected to a reference circuit 136. An output of switch 137 may be connected to the inverting input of amplifier 86 (FIG. 1).

From all the foregoing, one skilled in the art will appreciate that a controller for a power supply may comprise:

an output, such as for example output 55, configured to form a switching signal to control a primary current, such as for example current 39, through a primary winding of a transformer to regulate an output voltage formed from a secondary winding of the transformer;

a current sense circuit, such as for example circuit 82, configured to receive a current sense signal that is representative of the primary current and form a compensated current signal, such as for example signal 87;

a switching circuit, such as for example circuit 66, configured to form a pulse signal, such as for example signal 68, responsively to a clock signal, such as for example signal CCK, having a first frequency, a feedback signal that is representative of the output voltage, and a signal that is representative of the current sense signal;

a quasi-resonant circuit, such as for example circuit 90, configured to form a quasi-resonant switching signal, such as for example signal 91, responsively to the feedback signal, the compensated current signal, and a detection signal, such as for example ZCD signal, representative of a magnetization state of the transformer;

a control circuit, such as for example circuit 95, configured to select the controller for operating in a continuous current mode or a discontinuous current mode wherein the control circuit selects the pulse signal as the switching signal responsively to operating in the continuous current mode and selects the quasi-resonant switching signal as the switching signal responsively to operating in the discontinuous current mode;

a first jitter circuit, such as for example circuit 73, configured to vary a frequency of the clock signal around a center frequency of the clock signal in response to operating in the continuous current mode; and the current sense circuit, such as for example circuit 82, including a second jitter circuit, such as for example circuit 83, configured to form the compensated current signal as the current sense signal varied around a value of the current sense signal by a DCM jitter signal, in response to operating in the discontinuous current mode.

An embodiment may include that the current sense circuit may form the compensated current sense signal to be representative of the current sense signal in response to operating in the continuous current mode.

Another embodiment may include that the controller may not vary a frequency of the switching signal around a center frequency in response to operating in the discontinuous operation mode.

In another embodiment, the second jitter circuit may include a signal variation circuit that forms a value of the DCM jitter signal to vary between a maximum value and a minimum value at a DCM jitter frequency, the second jitter circuit including an amplifier that receives the current sense signal and forms the compensated current signal, in response to operating in the discontinuous current mode, as the current sense signal modulated by the DCM jitter signal.

An embodiment may include that the switching circuit may be a pulse width modulated (PWM) circuit that forms the pulse signal as a PWM signal.

Another embodiment may also include a demagnetization detection circuit, such as for example circuit 60, configured to receive a Demag signal, such as for example signal MG, representative of the magnetization state of the transformer and to detect substantially demagnetization of the transformer.

The control circuit may have an embodiment configured to select operation in the continuous current mode in response to detecting a combination of substantially no demagnetization of the transformer and the compensated current signal having a value of the current sense signal.

An embodiment of the control circuit may select operation in the discontinuous current mode in response to detecting a combination of substantially demagnetization of the transformer and the pulse signal having substantially the center frequency.

The controller may have an embodiment that counts valleys of a Demag signal representative of the magnetization state of the transformer after detecting substantially demagnetization of the transformer and prior to the pulse signal having substantially the center frequency.

The controller may have an embodiment that in response to selecting to switch from the continuous current mode to the discontinuous current mode the controller increases a value of the DCM jitter signal if a first jitter signal of the first jitter circuit was decreasing, or decreases the value of the DCM jitter signal if the first jitter signal was increasing.

An embodiment may include that the control circuit may inhibit varying a first jitter signal of the first jitter circuit in response to operating in the discontinuous current mode and inhibits varying the DCM jitter signal in response to operating in the continuous current mode.

Those skilled in the art will also appreciate that a method of forming a controller for a power supply may comprise:

configuring the controller to form a switching drive signal to control a primary current through a transformer to regulate an output voltage to a desired value, the controller receiving a current sense signal that is representative of the primary current; and configuring the controller, such as for example controller 50, to operate as a quasi-resonant controller, such as for example circuit 90, while operating in a discontinuous current mode and to operate as one of a pulse width or pulse frequency modulation controller, such as for example circuit 66, while operating in a continuous current mode wherein the controller varies a frequency of the switching drive signal around a center frequency while operating in the continuous current mode and wherein the controller forms a compensated current sense signal that varies a value of the compensated current sense signal around a value of the current sense signal but does not vary the frequency of the switching drive signal around a center frequency while operating in the discontinuous current mode.

The method may have an embodiment that includes forming a control circuit to select operation in the continuous current mode in response to detecting a substantially no demagnetization of the transformer and the compensated current sense signal substantially equaling the current sense signal.

An embodiment of the method may include forming a control circuit to select operation in the discontinuous current mode in response to detecting demagnetization of the transformer and the switching drive signal having substantially the center frequency.

Another embodiment may include forming the controller to vary the compensated current sense signal oppositely to a variation of the switching drive signal in response to changing from the continuous current mode to the discontinuous current mode.

An embodiment of the method may include forming the controller to vary the frequency of the switching drive signal oppositely to a variation of the compensated current sense signal in response to changing from the discontinuous current mode to the continuous current mode.

Those skilled in the art will also appreciate that a controller for a power supply may comprise:

the controller, such as for example controller 50, configured to form a switching drive signal to control a current through a transformer in order to regulate an output voltage to a desired value, the controller configured to receive a current sense signal that is representative of the current through the transformer;

a control circuit, such as for example one or more of circuits 90, 95, and/or 60, configured to select operation in a discontinuous current mode and form the switching drive signal as a quasi-resonant switching signal, the control circuit configured to select operation in a continuous current mode and form the switching drive signal as a pulse signal that is one of a pulse width modulated or a pulse frequency modulated signal; and the control circuit configured to form the pulse signal and the switching drive signal with a frequency that varies around a first center frequency in response to operating in the continuous current mode, and configured to form a compensated current sense signal having a value that varies around a value of the current sense signal and to not vary the frequency of the switching drive signal around a center frequency in response to operating in the discontinuous current mode.

Another embodiment of the controller may also include a quasi-resonant circuit that controls a duty cycle of the switching drive signal including disabling the switching drive signal according to the compensated current sense signal during operation in the discontinuous current mode.

An embodiment may also include a DCM jitter circuit, such as for example circuit 83, that modulates the value of the current sense signal to form the compensated current sense signal in response to operation in the discontinuous current mode.

In another embodiment, the DCM jitter circuit may form the compensated current sense signal to be substantially the current sense signal in response to operation in the continuous current mode.

Those skilled in the art will also appreciate that a controller for a power supply may comprise:

the controller configured to form a switching drive signal to control a primary current through a transformer to regulate an output voltage to a desired value, the controller receiving a current sense signal that is representative of the primary current; and a control circuit configured to cause the controller to operate as a quasi-resonant controller while operating in a discontinuous current mode and to operate as one of a pulse width or pulse frequency modulation controller while operating in a continuous current mode wherein the controller varies a frequency of the switching drive signal around a center frequency while operating in the continuous current mode and wherein the controller forms a compensated current sense signal that varies a value of the compensated current sense signal around a value of the current sense signal but does not vary the frequency of the switching drive signal around a center frequency while operating in the discontinuous current mode.

Another embodiment may include the control circuit configured to select operation in the continuous current mode in response to detecting a substantially no demagnetization of the transformer and the compensated current sense signal substantially equaling the current sense signal.

An embodiment may include that the control circuit is configured to select operation in the discontinuous current mode in response to detecting demagnetization of the transformer and the switching drive signal having substantially the center frequency.

In an embodiment, the controller may be configured to vary the compensated current sense signal oppositely to a variation of the switching drive signal in response to changing from the continuous current mode to the discontinuous current mode.

In another embodiment, the controller may be configured to vary the frequency of the switching drive signal oppositely to a variation of the compensated current sense signal in response to changing from the discontinuous current mode to the continuous current mode.

In view of all of the above, it is evident that a novel device and method is disclosed. Included, among other features, is forming a power supply circuit or controller to vary or jitter the value of the CS signal but not jitter the operating frequency during operation in the DCM mode, although the center frequency may vary due to the normal QR operation. Also, detecting that the jitter signal has reached the midpoint or middle value before making a CCM-to-DCM or DCM-to-CCM transition reduces fluctuations in the value of the output voltage and provides better regulation of the output voltage. During the transitions, controlling the jitter signal to vary oppositely to the previously varying or active jitter signal also assists in improving the output voltage regulation.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of system 10 and controller 50 are used as a vehicle to explain the operation method of transitioning from DCM-to-CCM and CCM-to-DCM. The example embodiment system 10 and/or controller 50 may have other embodiments as long as the embodiment controls the transitions as described herein.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A controller for a power supply comprising:
  an output configured to form a switching signal to control a primary current through a primary winding of a transformer to regulate an output voltage formed from a secondary winding of the transformer;
  a current sense circuit configured to receive a current sense signal that is representative of the primary current and form a compensated current signal;
  a switching circuit configured to form a pulse signal responsively to a clock signal having a first frequency, a feedback signal that is representative of the output voltage, and a signal that is representative of the current sense signal;
  a quasi-resonant circuit configured to form a quasi-resonant switching signal responsively to the feedback signal, the compensated current signal, and a detection signal representative of a magnetization state of the transformer;
  a control circuit configured to select the controller for operating in a continuous current mode or a discontinuous current mode wherein the control circuit selects the pulse signal as the switching signal responsively to operating in the continuous current mode and selects the quasi-resonant switching signal as the switching signal responsively to operating in the discontinuous current mode;
  a first jitter circuit configured to vary a frequency of the clock signal around a center frequency of the clock signal in response to operating in the continuous current mode; and
  the current sense circuit including a second jitter circuit configured to form the compensated current signal as the current sense signal varied around a value of the current sense signal by a DCM jitter signal, in response to operating in the discontinuous current mode.

2. The controller of claim 1 wherein the current sense circuit forms the compensated current sense signal to be representative of the current sense signal in response to operating in the continuous current mode.

3. The controller of claim 1 wherein the controller does not vary a frequency of the switching signal around a center frequency in response to operating in the discontinuous operation mode.

4. The controller of claim 1 wherein the second jitter circuit includes a signal variation circuit that forms a value of the DCM jitter signal to vary between a maximum value and a minimum value at a DCM jitter frequency, the second jitter circuit including an amplifier that receives the current sense signal and forms the compensated current signal, in response to operating in the discontinuous current mode, as the current sense signal modulated by the DCM jitter signal.

5. The controller of claim 1 wherein the switching circuit is a pulse width modulated (PWM) circuit that forms the pulse signal as a PWM signal.

6. The controller of claim 1 further including a demagnetization detection circuit configured to receive a Demag signal representative of the magnetization state of the transformer and to detect substantially demagnetization of the transformer.

7. The controller of claim 1 wherein the control circuit is configured to select operation in the continuous current mode in response to detecting a combination of substantially no demagnetization of the transformer and the compensated current signal having a value of the current sense signal.

8. The controller of claim 1 wherein the control circuit selects operation in the discontinuous current mode in response to detecting a combination of substantially demagnetization of the transformer and the pulse signal having substantially the center frequency.

9. The controller of claim 8 wherein the controller counts valleys of a Demag signal representative of the magnetization state of the transformer after detecting substantially demagnetization of the transformer and prior to the pulse signal having substantially the center frequency.

10. The controller of claim 1 wherein in response to selecting to switch from the continuous current mode to the discontinuous current mode the controller increases a value of the DCM jitter signal if a first jitter signal of the first jitter circuit was decreasing, or decreases the value of the DCM jitter signal if the first jitter signal was increasing.

11. The controller of claim 1 wherein the control circuit inhibits varying a first jitter signal of the first jitter circuit in response to operating in the discontinuous current mode and inhibits varying the DCM jitter signal in response to operating in the continuous current mode.

12. A method of forming a controller for a power supply comprising:
configuring the controller to form a switching drive signal to control a primary current through a transformer to regulate an output voltage to a desired value, the controller receiving a current sense signal that is representative of the primary current; and
configuring the controller to operate as a quasi-resonant controller while operating in a discontinuous current mode and to operate as one of a pulse width or pulse frequency modulation controller while operating in a continuous current mode wherein the controller varies a frequency of the switching drive signal around a center frequency while operating in the continuous current mode and wherein the controller forms a compensated current sense signal that varies a value of the compensated current sense signal around a value of the current sense signal but does not vary the frequency of the switching drive signal around a center frequency while operating in the discontinuous current mode.

13. The method of claim 12 including forming a control circuit to select operation in the continuous current mode in response to detecting a substantially no demagnetization of the transformer and the compensated current sense signal substantially equaling the current sense signal.

14. The method of claim 12 including forming a control circuit to select operation in the discontinuous current mode in response to detecting demagnetization of the transformer and the switching drive signal having substantially the center frequency.

15. The method of claim 12 including forming the controller to vary the compensated current sense signal oppositely to a variation of the switching drive signal in response to changing from the continuous current mode to the discontinuous current mode.

16. The method of claim 15 including forming the controller to vary the frequency of the switching drive signal oppositely to a variation of the compensated current sense signal in response to changing from the discontinuous current mode to the continuous current mode.

17. A controller for a power supply comprising:
the controller configured to form a switching drive signal to control a current through a transformer in order to regulate an output voltage to a desired value, the controller configured to receive a current sense signal that is representative of the current through the transformer;
a control circuit configured to select operation in a discontinuous current mode and form the switching drive signal as a quasi-resonant switching signal, the control circuit configured to select operation in a continuous current mode and form the switching drive signal as a pulse signal that is one of a pulse width modulated or a pulse frequency modulated signal; and
the control circuit configured to form the pulse signal and the switching drive signal with a frequency that varies around a first center frequency in response to operating in the continuous current mode, and configured to form a compensated current sense signal having a value that varies around a value of the current sense signal and to not vary the frequency of the switching drive signal around a center frequency in response to operating in the discontinuous current mode.

18. The controller of claim 17 further including a quasi-resonant circuit that controls a duty cycle of the switching drive signal including disabling the switching drive signal according to the compensated current sense signal during operation in the discontinuous current mode.

19. The controller of claim 17 further including a DCM jitter circuit that modulates the value of the current sense signal to form the compensated current sense signal in response to operation in the discontinuous current mode.

20. The controller of claim 19 wherein the DCM jitter circuit forms the compensated current sense signal to be substantially the current sense signal in response to operation in the continuous current mode.

* * * * *